United States Patent [19]

Lanzenberger

[11] 4,011,791
[45] Mar. 15, 1977

[54] TOOL CHUCKING DEVICE

[75] Inventor: Horst Lanzenberger, Munich, Germany

[73] Assignee: Friedrich Deckel Aktiengesellschaft, Munich, Germany

[22] Filed: Sept. 25, 1975

[21] Appl. No.: 616,588

[30] Foreign Application Priority Data

Oct. 23, 1974 Germany .......................... 2450323

[52] U.S. Cl. ............................ 90/11 D; 408/239 A
[51] Int. Cl.² .......................................... B23C 5/26
[58] Field of Search .......... 90/11 D, 11 A; 408/239

[56] References Cited

UNITED STATES PATENTS

| 1,807,265 | 5/1931 | Walker | 90/11 A |
| 3,177,775 | 4/1965 | Alisauskis | 90/11 A |
| 3,490,333 | 1/1970 | Scruton | 90/11 A |
| 3,851,562 | 12/1974 | Tomita | 90/11 D |

FOREIGN PATENTS OR APPLICATIONS 731,859  4/1966  Canada .............................. 90/11 A Primary Examiner—Gil Weidenfeld
Attorney, Agent, or Firm—Woodhams, Blanchard and Flynn

[57] ABSTRACT

A chucking device comprising an axially displaceable draw-in bar mounted inside a hollow tool spindle and carrying a coupling head which is adapted to positively engage the tool shank. The tool in such a device is chucked by inserting it into the socket in the tool spindle, coupling it with the draw-in bar which has been advanced into a forward position and by retracting the draw-in bar to draw the tool firmly into the socket in the tool spindle. The action of releasing the tool comprises the same steps but in the reverse order.

9 Claims, 3 Drawing Figures

TOOL CHUCKING DEVICE

FIELD OF THE INVENTION

The invention relates to a chucking device comprising, mounted inside a hollow tool spindle, an axially displaceable draw-in bar carrying a coupling head which is adapted positively to engage the tool shank. The tool in such a device is chucked up by inserting it into the socket in the tool spindle, coupling it with the draw-in bar which has been advanced into a forward position and by retracting the draw-in bar to draw the tool firmly into the socket in the tool spindle. The action for releasing the tool comprises the same steps in reverse order.

BACKGROUND OF THE INVENTION

A tool chucking device has already been described in which the coupling head contains several radially movable locking balls. For coupling the tool with the draw-in bar these balls are forced into special recesses in the tool shank and create a positive coupling connection between the coupling head and the tool shank (Wotan-Werke GmbH, Dusseldorf, prospectus No. 8358/3.0/5.72, page 4). It is a drawback of this known arrangement that the surface available for transmitting the tensile forces from the coupling head to the tool shank is very restricted because of the limited number and size of the locking balls and, particularly in the case of larger sized devices, an optimum holidng force cannot be obtained because it would involve exceeding the maximum permissible surface loading. An increase in the number of locking balls or of their dimensions is usually impossible because the space available inside the tool spindle is restricted by other factors. Another drawback of the known device is that its production and assembly is costly owing to the many individual components which it comprises.

It is an object of the present invention to provide a tool chucking device of the above-specified kind which combines simplicity and compactness with the ability to provide a very considerable holding respectively clamping force.

In one embodiment of the invention, this object is achieved by contriving the coupling head in the form of a slotted resiliently expandable sleeve-like member or the like having an internal grooved profile adapted to engage a matching external grooved profile on the tool shank, and by providing means for expanding the slotted sleeve-like member during its displacement in ejecting direction for the purpose of receiving or releasing the tool shank.

The slotted sleeve-like member is structurally as well as functionally a very simple component. The grooved profile provides a relatively large load-transferring surface for transmitting the holding or tightening force since this surface may extend around the entire circumference of the coupling head and tool shank without being restricted to a number of locking balls. More particularly, the invention permits a plurality of grooves to be provided axially in succession and the load transferring surface to be thereby increased nearly as many times as may be desired. According to the invention the grooved profile may be a screw thread or it may consist of a plurality of annular grooves or collars arranged in axial succession.

Since a plurality of axially consecutive bearing surfaces can be provided, the radial dimensions of each individual surface may be small and the slotted sleeve-like member will not thus have to be significantly deformed.

Another advantage is considered to reside in that the proposed device also permits tools to be chucked up which are provided with conventional screw threads, provided the coupling head is provided with the complementary matching threads. This fact enables the large numbers of spare conventional tools still held in stock by many users to be used up as desired.

Besides the said embodiment in which the gooved profile of the coupling head is arranged to engage the outside of a tool shaft provided with a complementary grooved profile, the scope of the invention is also intended to comprise the converse arrangement in which the slotted sleeve-like member has an external grooved profile for engagement with a corresponding internal gooved profile in an axial bore in the end of the tool shank.

The elastic deformation of the slotted sleeve-like member which enables the sleeve-like member to engage and release the tool is produced by cam elements located inside the tool spindle, such as pins projecting radially inwards or sleeves surrounding the slotted sleeve-like member. The pins or sleeves are provided with cam faces which cooperate with cam faces on the slotted sleeve-like member and cause the desired deformation when the sleeve-like member is axially displaced.

The cam elements are so designed that the draw-in movement and the ejecting movement of the locking head are each divided into two stages. In the first stage of the operation of drawing-in the tool, the slotted sleeve-like member is arranged to engage the tool shank; in the second stage, the coupling head performs the axial draw-in movement.

In the first stage of the ejecting operation, the tool is initially still retained by the coupling head to permit the force needed for releasing the tool from the spindle socket to be applied to the tool. During the second stage of the ejecting motion, the slotted sleeve-like member is deformed to release the tool from the coupling.

When a tool is inserted there is, however, some risk of the grooved profiles facing each other crest-to crest, so that mutual engagement cannot take place. In order to prevent the device from being thus jammed, the cam elements are so designed that in the first stage of the draw-in motion they are able to yield against a spring load by an amount corresponding roughly to the axial pitch of the grooves, thus enabling the locking head to shift in relation to the tool shank until mutual engagement is possible. Not until this is the case will the cam elements provide rigid counterfaces for the cam faces on the slotted sleeve-like member and thus in the second stage of the draw-in motion produce the required deformation of the sleeve-like member for engaging the tool.

In order to ensure that the tool is reliably ejected, steps must be taken to ensure that the first stage of the ejecting motion, which is the inversion of the second stage of the draw-in motion, is sufficiently large. According to the invention, a spring stop for the tool shank is therefore provided which intercepts the tool when it is initially inserted into the spindle socket and which prevents it from making immediate contact with the socket walls before it is actually forced into contact with them by the pull of the draw-in bar.

Other features of the invention will become apparent from further appendant claims and from the following particular description of embodiments of the invention.

BRIEF DESCRIPTION OF THE DRAWINGS

These embodiments are illustratively shown in the drawings and will be described in greater detail. In the drawings.

DETAILED DESCRIPTION

Figure 1:
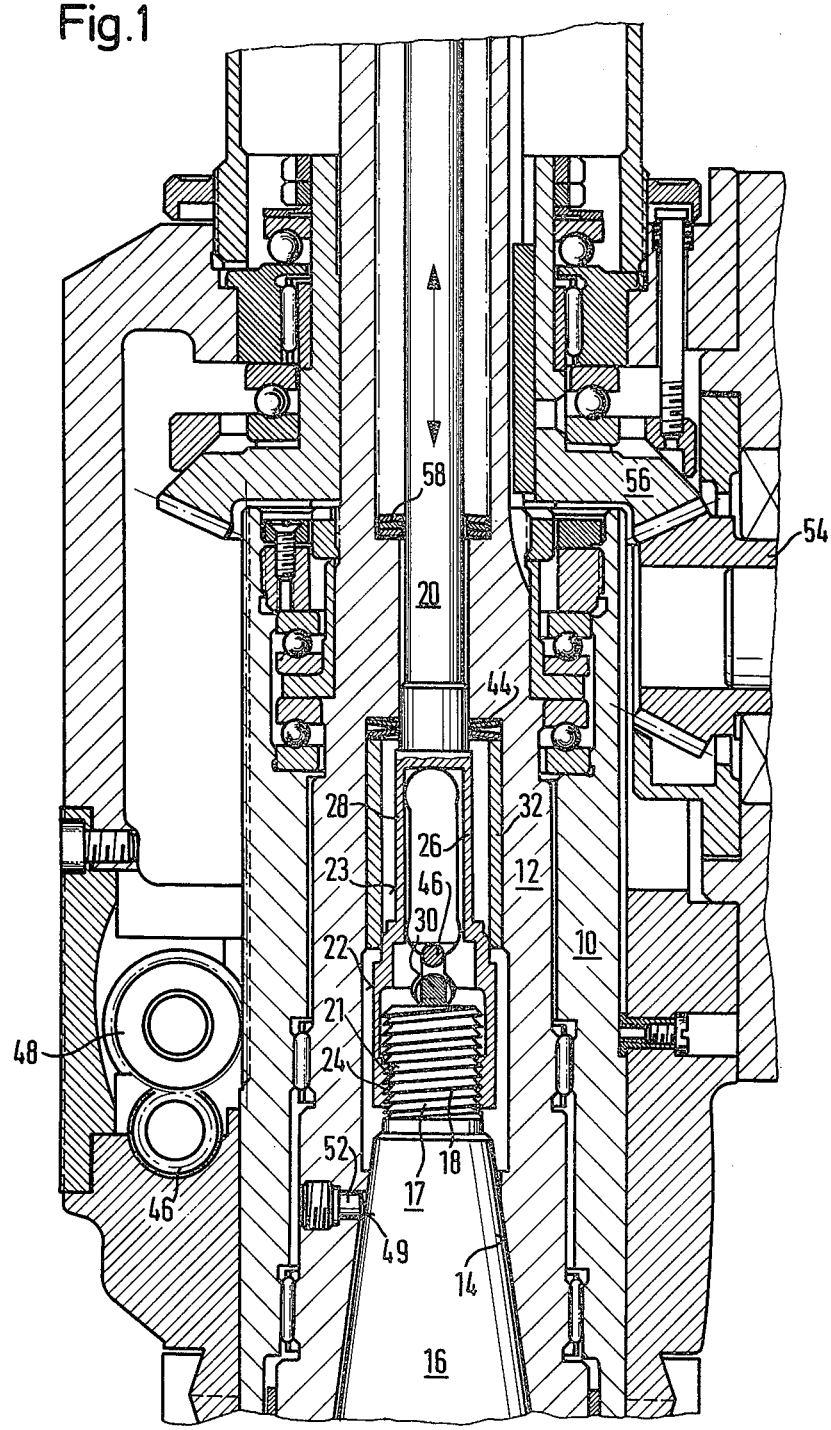
FIG. 1 is a longitudinal section of a tool chucking device for a tool shank provided with external threads.

The embodiment if FIG. 1 comprises a spindle sleeve 10 in which there is rotatably mounted a tool spindle 12 formed with a taper socket 14 for the reception of a tool, adapter, arbor or collet having a correspondingly shaped taper shank 16. The upper end of the shank, in its position in FIG. 1, is formed with a grooved profile 17 which, in the illustrated example, is constituted by an external screw thread 18 engageable by draw-in means adapted to draw the shank 16 tightly into the socket.

These draw-in means consist substantially, inside the hollow tool spindle 12, of an axially movably draw-in bar 20 which at its end facing the shaft 16 carries a coupling head 22 formed with a grooved profile 21, this in the present instance having the form of internal threads 24, matching the grooved profile 21 on the shank. The coupling is an axially twice slotted sleeve-like member 23, forming two jaws 26,28 which can elastically flexibly bend to the outside. When moved in ejecting direction, i.e. downwards in the drawing, these jaws 26,28 are forced apart by a pin 30 which projects into the gap between them, and they are then capable of clearing the external threads 18 on the tool shank 16 which has been inserted into the chuck. The coupling head 22 is retracted for gripping the tool shank. The jaws of the sloted sleeve-like member then disengage themselves from the pin 30 and spring back into their normal positions, in which they engage the external threads 18 on the tool shank 16. During the further retraction of the draw-in bar 20, the jaws 26,28 of the coupling head are additionally locked in closed position be a sleeve 32 which embraces the sleeve-like member. A locked coupling between the tool shank and the draw-in bar is thus created.

For releasing the tool shank, the draw-in bar 20 and the coupling head 22 are advanced in ejecting direction, i.e. in the drawing downwards. During the initial stage of this movement, the jaws 26,28 of the slotted sleeve-like member are released by the sleeve 32 and then forced apart by the pin 30 which thus disengages them from the external threads 18, permitting the shank 16 to be removed.

Figure 2:
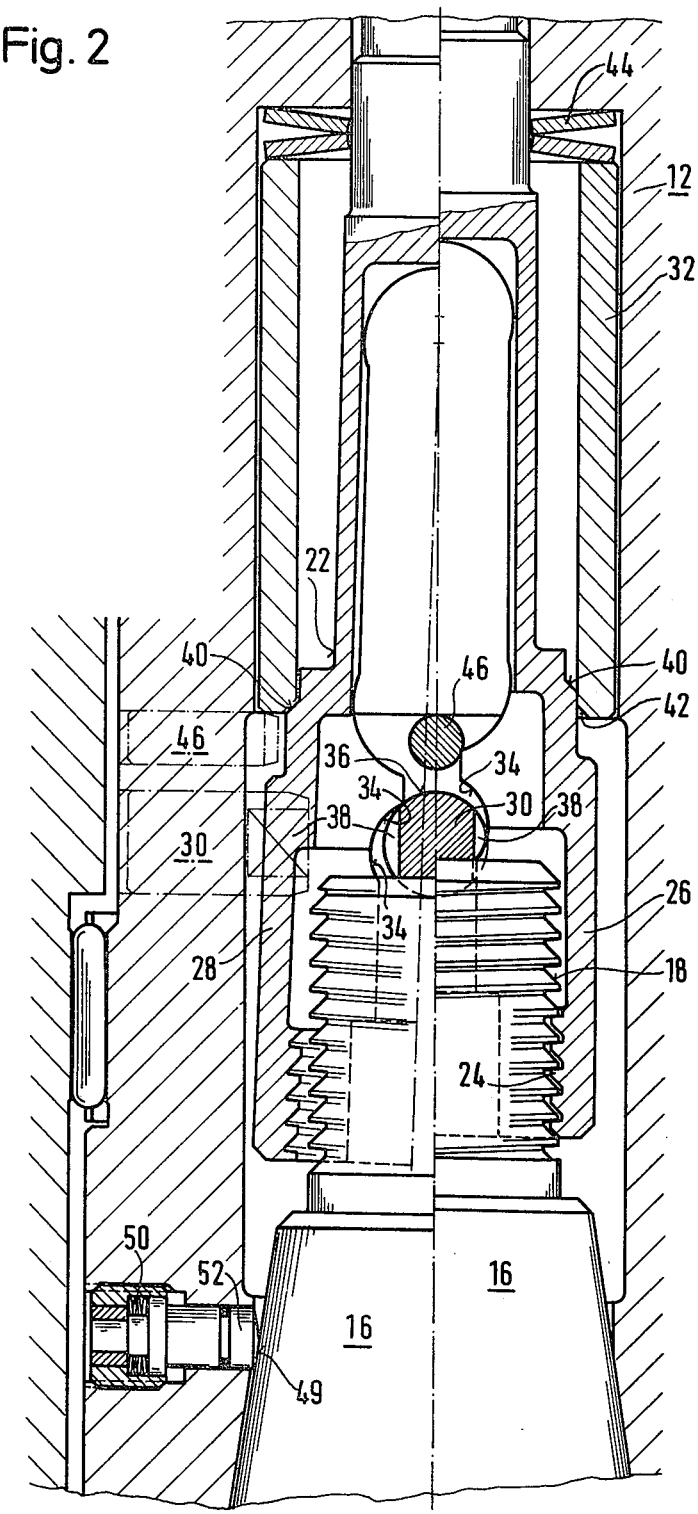
FIG. 2 is a larger representation of the coupling head in FIG. 1.

FIG. 2 is a larger scale representation of the described chucking device, the right-hand half of the drawing showing a tool shank 16 in chucked-up position and the left-hand half showing the tool shank released. As will be understood from FIG. 2, the jaws 26,28 each are formed with a circularly arcuate cam surface 34 for cooperation with the pin 30. When the coupling head 22 is moved in ejecting direction these cam surfaces 34 make contact with the upper circumferential surface 36 of the pin 30 and they are forced outwards (left-hand side of drawing). In this position, the tool shank 16 can be inserted without contact being made between the external and the internal threads 18 and 24. In order to limit the separation of the jaws 26,28 to a specific amount, the pin 30 is formed with a flat 38 on each side. The jaws will therefore attain their maximum lateral deflection when they have reached the position shown in the left-hand half of FIG. 2.

For closing the chucking device on the shank, the draw-in bar 20 and its coupling head 22 are withdrawn upwards. The jaws 26,28 will then spring back into their normal positions in which the internal threads 24 engage the external threads 18 on the tool shank (right-hand half of drawing). During the further retraction of the coupling head 22 in closing direction, the coned faces 40 on the outside of the coupling head ride into contact with corresponding faces 42 of the sleeve 32 and cause the jaws 26,28 to be pressed together tightly before they can be drawn into the sleeve 32.

As already described, ejection proceeds in the reverse order. The coupling head 22 is pushed downwards. Although the slope of the tooth flanks of the illustrated sawtooth threads tends to push the jaws 26,28 apart during the ejecting movement, the jaws are retained in closed position by the sleeve 32 during the initial stage of the movement, the tool continuing to be held, though being released from the taper socket, by the ejecting motion of the draw-in bar. Not until the second stage is reached and the jaws 26,28 have been released by the sleeve 32, can the jaws be opened by the pin 30 to allow the shank 16 of the tool to drop out or to be removed.

In order to prevent the chucking device from jamming when the tool is being inserted, the sleeve 32 is axially yieldable against the resistance of a spring 44 in the tool spindle 12. For example, if at the instant of engagement between the two sets of threads 18,24, the crests of two opposing threads should face each other, then it is possible for the sleeve 32 together with the coupling head 22 slightly to yield upwards without causing the jaws 26,28 to be forced more tightly together, and thereby permit the desired mutual engagement to take place. As soon as the jaws have sprung back into their normal positions, the sleeve 32 can be forced by the spring 44 back into its former lowermost position in which it rests on a stop pin 46.

A reliable release of the tool shank 16 from the socket 14 is assured only if the jaws 26,28 of the coupling head 22 continue to be held together by the sleeve 32 during the first stage of the releasing motion, i.e. if during the process of draw-in the jaws have been pulled up into the sleeve 32 far enough. A spring stop 49 is therefore provided which prevents the tool 16 from making contact with the walls of the socket at its initial insertion. The creation of the necessary path length for tightening is thus assured. If the socket is a tapered socket, as in the illustrated example, then the spring stop 49 may be a pin 52 loaded by a spring 50 and projecting radially inwards into the taper socket, but capable of yielding to the outside when the tool shank is drawn in.

The expanding pin 30 and the stop pin 46 are fitted prior to assembling the tool spindle 12. After having been turned through a right angle, their contours are shown again in side view on the left-hand side in FIG. 2.

The remainder of the construction of the tool spindle 12, its drive through the spindle sleeve 10, gearwheels 46,48 engaging the spindle sleeve, and its rotary drive through bevel wheels 54,56 are conventional and call for no particular description. The means for operating the draw-in bar for gripping and releasing a tool, or the like, may also be of conventional kind and need no special elucidation. Preferably, the draw-in bar is loaded by springs 58 in the direction of draw-in, and release is against these springs either by hand or power means (FIG. 1).

Figure 3:
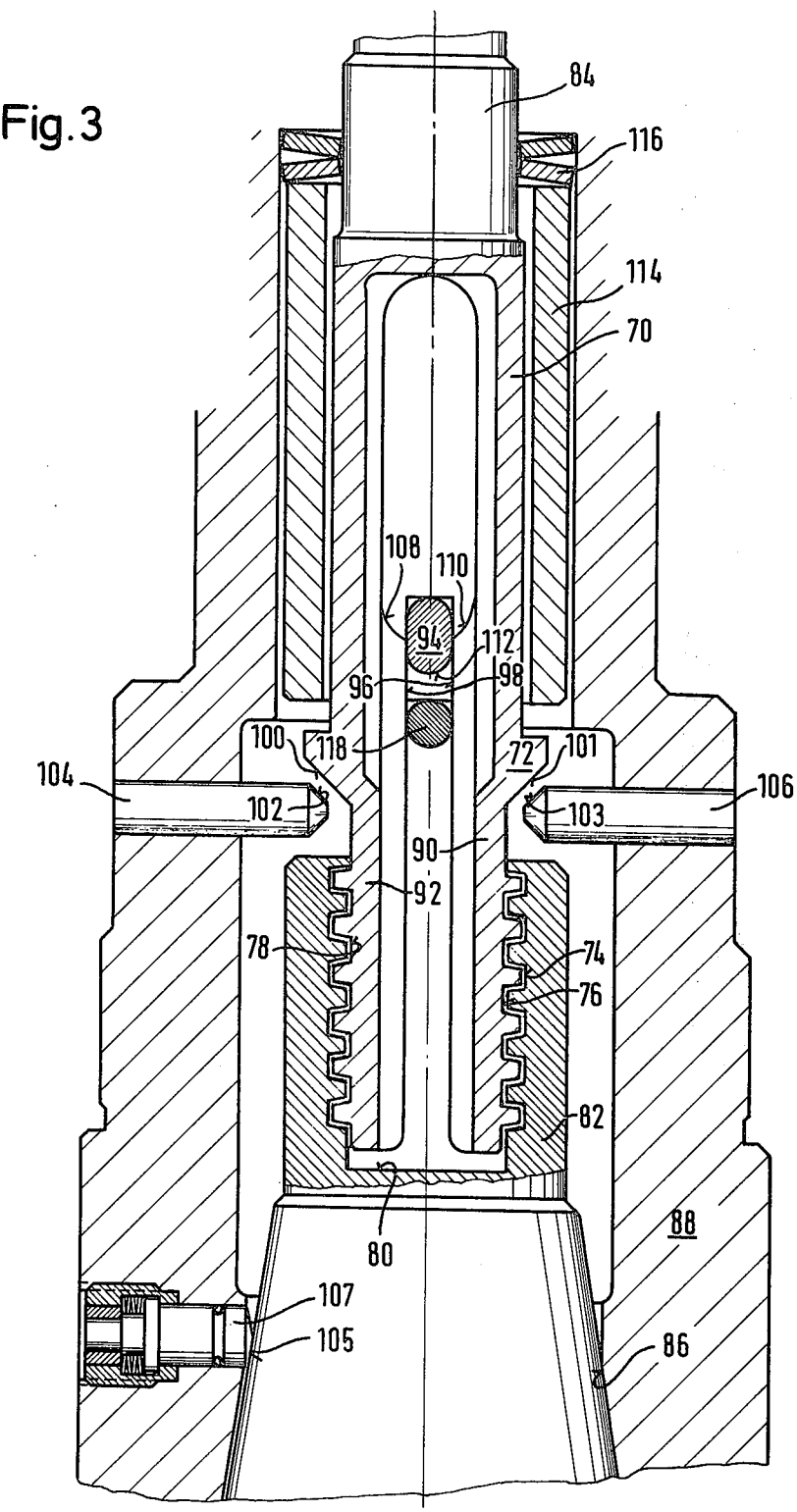
FIG. 3 is a similar representation to that in FIG. 2, but for the reception of a tool shank provided with a plurality of annular grooves inside a bore in the end of the shank.

FIG. 3 is an embodiment in which the coupling head does not grip the tool shank from the outside, but engages it from the inside in an axial bore in the end of the shank. This arrangement requires a different design of the elements which control the engagement and release of the tool.

The coupling head 70 again has the form of a slotted sleeve-like member 72. This is formed on its outside with a grooved profile 74 which in the drawing is not a continuous thread but consists of a plurality of axially consecutive annular grooves 76. The cross section of the annular grooves may be nearly rectangular with slightly sloping flanks to facilitate engagement. This grooved profile matches a complementary grooved profile 78 inside an axial bore 80 in the end of the tool shank 82.

The slotted sleeve-like member 72 in this embodiment must be compressed for releasing the tool shank 82 and expanded for engaging the same. In detail, this is accomplished as follows:

FIG. 3 shows the tool held in position for use. For releasing the tool the draw-in bar 84 must be advanced axially in ejecting direction, i.e. downwards in the drawing, causing the tool shank 82 to be released from the taper socket 86 of the tool spindle 88. In this first stage of the ejecting movement the two halves of the slotted sleeve-like member 72 are kept in expanded position by a pin 94 against which their inside axially parallel faces 96,98 bear. Consequently, the tool shank remains firmly attached to the coupling head.

In the second stage of the ejecting movement, cam faces 100,101 on the slotted sleeve-like member 72 make contact with cooperating cam faces 102,103 on pins 104,106 which project radially inwards from the wall of the tool spindle. Consequently, during the continuation of the ejecting motion the halves of the coupling head are forced inwards to release the tool shank and to allow the tool to be removed.

Draw-in of the tool proceeds in the converse order. The tool shank 82 is first inserted into the socket 86 in the end of the tool spindle 88 and, in order to ensure the creation of a sufficient path length for tightening, it is first retained by a stop 105, such as a pin 107, as already described above in connection with the preceding embodiment with reference to FIG. 2. In the first stage of the draw-in motion, the cam faces 100,101 lose contact with the cam faces 102,103 on the pins 104,106, thereby permitting the halves 90,92 of the sleeve-like member 72 to expand elastically to bring their grooved profile 74 into engagement with the groove profile 78 inside the tool shank. In the second stage of the draw-inaction, the faces 108,110 of the halves 90,92 ride over the faces 112 of the pin 94 which locks them in their expanded position. The tool is therefore locked to the coupling head and can be drawn fully into the socket.

The pin 94 is fixed inside a sleeve 114 which embraces part of the length of the coupling head. This sleeve performs the same functions as the sleeve 32 in the preceding embodiment. For instance, if during the insertion of the tool the groove profiles 74,78 should be opposed crest-to-crest, preventing them from mutually engaging, then the application of pull to the draw-in bar will permit the pin 94 and the sleeve to yield upwards when the side faces 108,110 make contact with the pin 94, until the groove profiles are suitably positioned to snap into mutual engagement. The sleeve 114 can then be returned by its spring 116 into its lower position in which it is retained by a pin 118.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an excessive property or privilege is claimed are defined as follows:

1. A tool chucking device having an axially displaceable draw-in bar mounted inside a hollow spindle, and carrying a coupling head means thereon which is adapted to positively engage a shank of a tool, comprising the improvement wherein said coupling head means includes a slotted resiliently expandable sleeve-like member having an internal grooved profile, wherein said tool shank has a complementary external grooved profile adapted to engage said internal grooved profile, wherein expanding means are provided for expanding the slotted sleeve-like member during a displacement in ejecting direction for the purpose of releasing the tool shank and wherein said expanding means comprises stationary pin means projecting into a slot in said slotted sleeve-like member, said pin means and said slotted sleeve-like member having cooperating cam faces which make mutual contact during said displacement of said slotted sleeve-like member in said ejecting direction to thereby cause said sleeve-like member to be expanded.

2. A tool chucking device according to claim 1, including compressing means for compressing said slotted sleeve-like member during a displacement in a draw-in direction of said tool, the operations of expansion and compression of said slotted sleeve-like member taking place along consecutive portions of the displacement path of said slotted sleeve-like member.

3. A tool chucking device according to claim 2, wherein said compressing means comprises an additional sleeve embracing said slotted sleeve-like member, said additional sleeve and slotted sleeve-like member having cooperating faces which make contact during the draw-in displacement of said slotted sleeve-like member and cause said slotted sleeve-like member to be compressed.

4. A tool chucking device according to claim 3, wherein said sleeve embracing said slotted sleeve-like member is yieldingly displaceable, in the direction of draw-in, against the resistance of a spring a distance which generally corresponds to the axial pitch of the grooves forming said grooved profile.

5. A tool chucking device according to claim 3, wherein during displacement of said slotted sleeve-like member is said ejecting direction, said additional sleeve embracing said slotted sleeve-like member is retained by an arresting pin which is insertable into the spindle wall from the outside and projects into the tool spindle interior.

6. A tool chucking device according to claim 1, wherein a spring stop for said tool shank is provided which effects a retaining of said tool shank when this is first inserted into the socket provided for its reception and before it is drawn against the walls of the socket by the draw-in bar.

7. A tool chucking device according to claim 6, wherein said stop is a radially spring-loaded pin which projects from the side into said socket, and which is adapted to yield radially outwards when the tool shank is drawn in by the draw-in bar.

8. A tool chucking device according to claim 1, wherein the draw-in bar is spring-loaded in the direction of draw-in and wherein said draw-in bar is releasable by release means against the resistance of the spring.

9. A tool chucking device according to claim 1, wherein the groove profiles on said slotted sleeve-like member and on the tool shank are screw threads.

* * * * *

UNITED STATES PATENT AND TRADEMARK OFFICE
CERTIFICATE OF CORRECTION

PATENT NO. : 4 011 791

DATED : March 15, 1977

INVENTOR(S) : Horst Lanzenberger

It is certified that error appears in the above-identified patent and that said Letters Patent are hereby corrected as shown below:

Column 6, line 20; change "excessive" to ---exclusive---.

Signed and Sealed this fifth Day of July 1977

[SEAL]

Attest:

RUTH C. MASON
*Attesting Officer*

C. MARSHALL DANN
*Commissioner of Patents and Trademarks*